United States Patent
Jia et al.

(10) Patent No.: US 11,394,872 B2
(45) Date of Patent: Jul. 19, 2022

(54) METHOD AND APPARATUS FOR JOINTLY CALIBRATING EXTERNAL PARAMETERS OF MULTIPLE CAMERAS, DEVICE AND MEDIUM

(71) Applicant: BEIJING BAIDU NETCOM SCIENCE AND TECHNOLOGY CO., LTD., Beijing (CN)

(72) Inventors: Jinrang Jia, Beijing (CN); Yifeng Shi, Beijing (CN); Xing Hu, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 171 days.

(21) Appl. No.: 16/896,294

(22) Filed: Jun. 9, 2020

(65) Prior Publication Data

US 2021/0112190 A1    Apr. 15, 2021

(30) Foreign Application Priority Data

Oct. 9, 2019   (CN) .......................... 201910955707.0

(51) Int. Cl.
  *H04N 5/232*   (2006.01)
  *G06T 7/80*    (2017.01)
  *G06F 17/18*   (2006.01)

(52) U.S. Cl.
  CPC ......... *H04N 5/23216* (2013.01); *G06F 17/18* (2013.01); *G06T 7/80* (2017.01)

(58) Field of Classification Search
  CPC ....... H04N 5/23216; G06F 17/18; G06T 7/80; G06T 2207/30204; G06T 2207/30244; G06T 7/85
  See application file for complete search history.

(56) References Cited

U.S. PATENT DOCUMENTS 10,666,934 B1 *   5/2020   Wang .................... G06T 7/97
11,172,193 B1 *  11/2021   Reddy ................ H04N 17/004
(Continued)

FOREIGN PATENT DOCUMENTS

CA    2942258 A1    3/2017
CN  104766291 A    7/2015
(Continued)

OTHER PUBLICATIONS

Chinese Patent Application No. 201910955707.0 First Office Action dated Oct. 27, 2021, 15 pages.
(Continued)

*Primary Examiner* — Mekonnen D Dagnew
(74) *Attorney, Agent, or Firm* — Lathrop GPM LLP

(57) ABSTRACT

A method and apparatus for jointly calibrating external parameters of multiple cameras. The method includes: determining an overlapped area of angles of view of cameras, and obtaining a 2D verification point set in an image of the overlapped area, the 2D verification point set including at least one verification point; performing external parameter calibration for each camera separately to obtain a current external parameter of the camera; calculating coordinates of a 3D point corresponding to each verification point in a world coordinate system using the current external parameter of each camera separately, and calculating a loss function based on the coordinates of the 3D point, the loss function being used to measure an overlay error of calibration of the cameras under the current external parameter; and performing joint calibration based on the loss function to obtain a target external parameter of each camera.

18 Claims, 3 Drawing Sheets

(56) References Cited

U.S. PATENT DOCUMENTS

| | | | |
|---|---|---|---|
| 2018/0213218 A1* | 7/2018 | Yu | G06V 10/10 |
| 2018/0316905 A1 | 11/2018 | Nobori et al. | |
| 2020/0034989 A1* | 1/2020 | Koyama | G06T 7/85 |

FOREIGN PATENT DOCUMENTS

| | | | |
|---|---|---|---|
| CN | 106898025 A | 6/2017 | |
| CN | 107146254 A | 9/2017 | |
| CN | 107862719 A | 3/2018 | |
| CN | 108010085 A | 5/2018 | |
| CN | 108564629 A | 9/2018 | |
| CN | 108921907 A | 11/2018 | |
| CN | 109064404 A | 12/2018 | |
| CN | 109242915 A | 1/2019 | |
| CN | 109523597 A | 3/2019 | |
| CN | 109598765 A | 4/2019 | |
| CN | 110189382 A | 8/2019 | |
| EP | 3392836 A1 | 10/2018 | |
| WO | WO 2019/170166 A1 | 9/2019 | |

OTHER PUBLICATIONS

Chinese Patent Application No. 201910955707.0 English translation of First Office Action dated Oct. 27, 2021, 7 pages.

Luis et al., Nano Scale Geometric Measurement and Mechanical Measurement Technology, Hallitaria Industrial University Press, 4 pages.

Yanchi et al., Research on 3D Shape Measurement Method of Large Object Based on Total Station and Ordinary Digital Camera, Medium Mine University Press May 2019, 4 pages.

Study on Several Key Technologies of Double Camera System in Digital Close-Range Photogrammetry, Liaoning University of Engineering Technology, Master Degree Thesis, Dec. 15, 2011, 89 pages.

Ruihua, Study on the Algorithm of Fast Calibration for Multi-camera System, Dissertation Submitted for the Degree of Master Hefei University of Technology, Apr. 2017.

* cited by examiner

METHOD AND APPARATUS FOR JOINTLY CALIBRATING EXTERNAL PARAMETERS OF MULTIPLE CAMERAS, DEVICE AND MEDIUM

CROSS-REFERENCE TO RELATED APPLICATIONS

This application claims priority to Chinese Patent Application No. 201910955707.0, filed on Oct. 9, 2019, titled "Method and apparatus for jointly calibrating external parameters of multiple cameras, device and medium," which is hereby incorporated by reference in its entirety.

TECHNICAL FIELD

The present disclosure relates to image processing technology and is applicable in the field of autonomous driving, specifically relates to a camera external parameter calibration technology, and more specifically to a method and apparatus for jointly calibrating external parameters of multiple cameras, device and medium.

BACKGROUND

Camera external parameter calibration refers to that after a camera is installed, a transformation matrix (composed of a rotation matrix and a translation vector) of the world coordinate system to the camera coordinate system is obtained by a certain method. This transformation matrix is the external parameter of a camera. The external parameter of the camera is a necessary condition to connect the position of an object in the real world and a pixel position in an image. It is very important in the fields where the position of an object in the image needs to be located, such as autonomous driving or security. Therefore, it is necessary to calculate accurate external parameter of the camera.

SUMMARY

Embodiments of the present disclosure provide a method and apparatus for jointly calibrating external parameters of multiple cameras, device and medium, so as to reduce an overlay error of the multi-camera external parameter.

An embodiment of the present disclosure provides a method for jointly calibrating external parameters of multiple cameras, the method including: determining an overlapped area of angles of view of cameras, and obtaining a two-dimensional (2D) verification point set in an image of the overlapped area, the 2D verification point set comprising at least one verification point; performing external parameter calibration for each camera separately to obtain a current external parameter of each camera; calculating coordinates of a three-dimensional (3D) point corresponding to each verification point in a world coordinate system using the current external parameter of each camera separately, and calculating a loss function based on the coordinates of the 3D point, the loss function being used to measure an overlay error of calibration of the cameras under the current external parameter; and performing joint calibration based on the loss function to obtain a target external parameter of each camera.

The above embodiment of the disclosure has the following advantages or beneficial effects: by adding a verification link on the basis of the existing technology, a loss function is calculated based on the 3D point of a verification point mapped back to the world coordinate system, and the loss function is used to measure an overlay error of calibration of the cameras under the current external parameters, thus playing certain verification function, and multi-camera joint calibration is performed based on the loss function to determine a final target external parameter, which largely eliminates the overlay of multi-camera errors and provides a good basis for subsequent multi-camera fusion.

Alternatively, the performing joint calibration based on the loss function to obtain a target external parameter of each cameras, includes: executing repeatedly following operations until a number of executions meets a preset threshold, and using an external parameter of an cameras corresponding to a loss function whose value satisfies a preset condition in loss functions obtained by calculation as the target external parameter of the camera: performing external parameter calibration for each camera separately to obtain the current external parameter of each camera; and calculating the coordinates of the 3D point corresponding to each verification point in the world coordinate system using the current external parameter of each camera separately, and calculating the loss function based on the coordinates of the 3D point.

The above embodiment of the disclosure has the following advantages or beneficial effects: by iterating a plurality of times to find each loss function, and finding the optimal solution from the loss functions, the optimal camera external parameters are obtained.

Alternatively, calculating the loss function based on the coordinates of the 3D point, includes: using any verification point as a current verification point, and calculating a variance based on coordinates of a 3D point of the current verification point obtained by calculation corresponding to each camera; and summing variances obtained by calculation corresponding to verification points, and using a sum value as the loss function.

The above embodiment of the disclosure has the following advantages or beneficial effects: without knowing the true value of the verification point in the world coordinate system, the calculation of the variance is used to measure the degree of convergence of the 3D points mapped by the cameras for the same verification point in the world coordinate system. The better the degree of convergence is, it shows that the reprojection errors of the cameras are more tend to be in the same direction, and the smaller the overlay error is, so that it plays a measuring and verifying function to the overlay error of calibration of the cameras under the current external parameters through the loss function.

Alternatively, calculating the loss function based on the coordinates of the 3D point, includes: using any verification point as a current verification point, determining a distance between a 3D point of the current verification point obtained by calculation corresponding to each camera and the true value based on a truth value of the current verification point in the world coordinate system, and calculating a mean of the distance; calculating a variance based on coordinates of the 3D point of the current verification point obtained by calculation corresponding to each camera combining the truth value; weighting and summing the variance and the mean obtained by calculation corresponding to the current verification point; and summing results of the weighting and summing obtained by calculation corresponding to verification points, and using a sum value as the loss function.

The above embodiment of the disclosure has the following advantages or beneficial effects: in the case that the true value of the verification point in the world coordinate system can be obtained, the mean and variance are together used as part of the loss function. The variance may measure the degree of convergence of the 3D points, and the mean may measure the distance between the 3D points and the true value. In order to improve the accuracy of finding the optimal solution of the external parameter, the overlay error of calibration of the cameras are further measured from the two angles of convergence degree and distance from the true value.

Alternatively, calculating the loss function based on the coordinates of the 3D point, further includes: determining a minimum distance value between any two 3D points in 3D points of the current verification point obtained by calculation corresponding to each camera; and adding the loss function to the distance value corresponding to each verification point obtained by calculation, on the basis of the loss function obtained by calculation.

The above embodiment of the disclosure has the following advantages or beneficial effects: on the basis of calculating the loss function through the variance and the mean, an additional dimension is added, that is, the distance between any two 3D points, because if the distance between any two 3D points is smaller, the dimension indicates that the overlay error of the external parameters is smaller, thereby further improving the accuracy of measuring the overlay error by the loss function.

Alternatively, the performing external parameter calibration for each camera separately to obtain the current external parameter of each camera, includes: performing external parameter calibration for each camera separately using a closest point matching method and a minimized reprojection error method to obtain the current external parameter of each camera.

In a second aspect, an embodiment of the present disclosure provides an apparatus for jointly calibrating external parameters of multiple cameras, the apparatus including: a verification point set acquisition module, configured to determine an overlapped area of angles of view of cameras, and obtain a two-dimensional (2D) verification point set in an image of the overlapped area, the 2D verification point set including at least one verification point; a single camera external parameter calibration module, configured to perform external parameter calibration for each camera separately to obtain a current external parameter of each cameras; a loss function calculation module, configured to calculate a coordinate of a three-dimensional (3D) point corresponding to each verification point in a world coordinate system using the current external parameter of each cameras separately, and calculate a loss function based on the coordinates of the 3D point, the loss function being used to measure an overlay error of calibration of the cameras under the current external parameter; and a multi-camera joint calibration module, configured to perform joint calibration based on the loss function to obtain a target external parameter of each camera.

In a third aspect, an embodiment of the present disclosure provides an electronic device, including: at least one processor; and a storage apparatus, in communication connection with the at least one processor; the storage apparatus, storing instructions executable by the at least one processor, the instructions, when executed by the at least one processor, cause the at least one processor to implement the method for jointly calibrating external parameters of multiple cameras according to any embodiment of the present disclosure.

Embodiments of the disclosure have the following advantages or beneficial effects: by adding a verification link on the basis of the existing technology, and determining the optimal external parameter of the camera joint calibration through the result of the verification point set back to 3D, it solves the limitation problem of considering only single camera reprojection error in single camera calibration in the past, which largely eliminates the overlay of multi-camera errors and provides a good basis for subsequent multi-camera fusion.

Other effects possessed by the above alternative methods will be described below in conjunction with specific embodiments.

BRIEF DESCRIPTION OF THE DRAWINGS

The accompanying drawings are used to better understand the present solution and do not constitute a limitation of the present disclosure.

DETAILED DESCRIPTION OF EMBODIMENTS

The following describes exemplary embodiments of the present disclosure with reference to the accompanying drawings, which includes various details of embodiments of the present disclosure to facilitate understanding, and they should be considered as merely exemplary. Therefore, those of ordinary skills in the art should recognize that various changes and modifications may be made to the embodiments described herein without departing from the scope and spirit of the present disclosure. Also, for clarity and conciseness, descriptions of well-known functions and structures are omitted in the following description.

In scenarios of calculating camera external parameters, there are some application scenarios that require distributed multi-camera to shoot the same scenario from different positions and angles, such as roadside perception, that is, a plurality of cameras are distributed at the intersection, subsequently, multi-camera fusion is then performed to locate the target in this scenario. However, there may be error in the external parameter calibration of a single camera, then in distributed multi-camera calibration, the maximum error of the external parameter calibration of different cameras may be overlapped, resulting in inaccuracy of the target returning to 3D position, which may affect subsequent multi-camera fusion. However, in embodiments of the present disclosure, by adding a verification link on the basis of the existing technology, and determining the optimal external parameter of the camera joint calibration through the result of the verification point set back to 3D, it solves the limitation problem of considering only single camera reprojection error in single camera calibration in the past, which largely eliminates the overlay of multi-camera errors and provides a good basis for subsequent multi-camera fusion.

Figure 1:
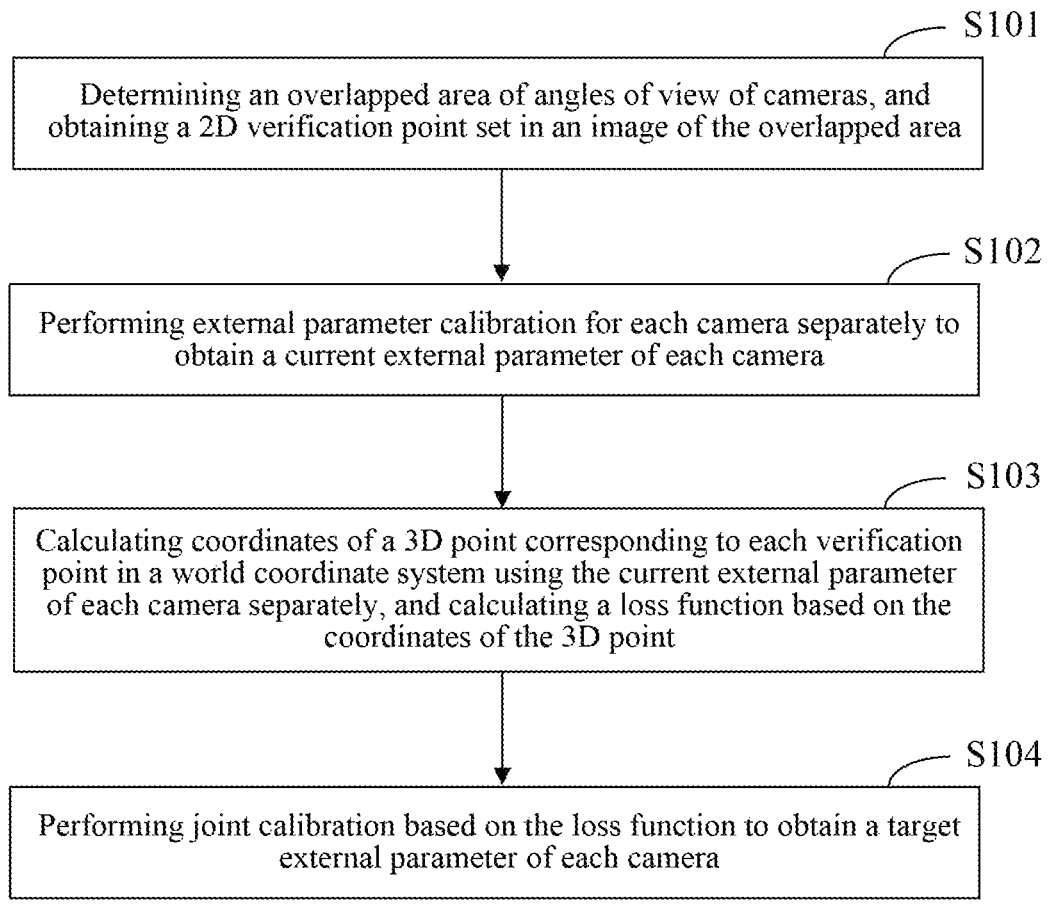
FIG. 1 is a schematic flowchart of a method for jointly calibrating external parameters of multiple cameras according to a first embodiment of the present disclosure.

FIG. 1 is a schematic flowchart of a method for jointly calibrating external parameters of multiple cameras according to the first embodiment of the present disclosure. The present embodiment is applicable to the case of joint calibration of external parameters of multiple cameras, for example, a plurality of cameras arranged in a distributed mode in a drive test perception application scenario. The method may be performed by an apparatus for jointly calibrating external parameters of multiple cameras, which is implemented in software and/or hardware, and is preferably configured in an electronic device, such as a computer device or a server. As shown in FIG. 1, the method specifically includes the following steps.

S101, determining an overlapped area of angles of view of cameras, and obtaining a two-dimensional (2D) verification point set in an image of the overlapped area, the 2D verification point set including at least one verification point.

In a distributed multi-camera scenario, such as a drive test perceived application scenario, usually a plurality of cameras are used to simultaneously capture a given location or target, such as a certain intersection. Therefore, there may be the overlapped area of the angles of view of the cameras, that is, an area that may be captured by each camera. The selected 2D verification point may be a point in the overlapped area, or may be a plurality of points, preferably is a point that does not participate in the calibration of camera external parameter in S102, so as to have a verification function.

S102, performing external parameter calibration for each camera separately to obtain a current external parameters of each camera.

Here, any method in the prior art may be used to separately perform external parameter calibration for a single camera, for example, a method combining the closest point matching with the minimized reprojection error to minimize the error of reprojection. In addition, calibration may alternatively be performed combining a specific marker, or an additional sensor to assist in calibration. The embodiments of the present disclosure do not make any limitation in this regard.

S103, calculating coordinates of a three-dimensional (3D) point corresponding to each verification point in a world coordinate system using the current external parameter of each camera separately, and calculating a loss function based on the coordinate of the 3D point, the loss function being used to measure an overlay error of calibration of the camera under the current external parameter.

S104, performing joint calibration based on the loss function to obtain a target external parameter of each camera.

For example, performing external parameter calibration using the method of closest point matching combined with solution to minimize reprojection error (BA, Bundle Adjustment). Due to the uncertainty of closest point matching, the result of performing closest point matching and BA for a plurality of times has a certain randomness. For example, for a given target point on a camera image, if the 3D point corresponding to the target point in the world coordinate system is calculated based on the external parameter obtained in each calibration, as shown in (a) in FIG. 2, point A is the true value point of the target point, and the other points are calculated 3D points corresponding to each calibration. It may be found that when the errors are the same, these 3D points may appear at different positions of the true point A. It should also be noted that, in the process of calculating the 3D points corresponding to the world coordinate system based on the external parameters, the ground equation and the internal parameter of the camera also need to be combined. In the embodiments of the present disclosure, the ground equation and the internal parameter of the camera may be considered as fixed truth values.

Figure 2:
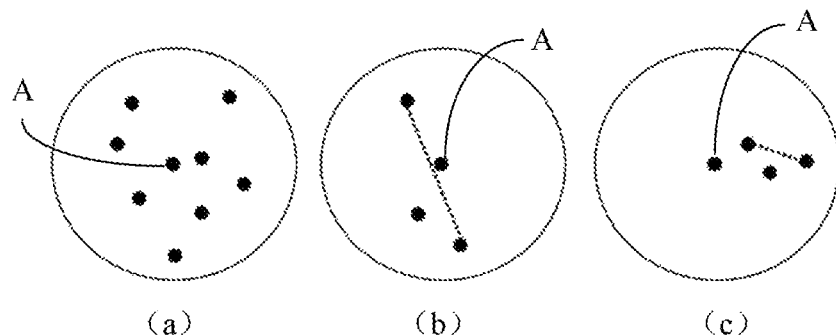
FIG. 2 is a schematic diagram of an overlay error of multi-camera calibration in the first embodiment of the present disclosure.

Further, as shown in (b) of FIG. 2, similarly, point A is the true value point of the target point, taking the calibration of 4 cameras as an example, and the other 4 points are 3D points corresponding to the target point in the world coordinate system calculated separately based on the respective external parameters of the 4 cameras. It may be seen from (b) that when the 4 cameras independently obtain external parameters, although the error of each camera meets a requirement, the maximum error may be overlapped due to the different error directions of the cameras, such as shown by the dotted line in (b), the length of the dotted line may be used to measure the size of the overlay error.

Therefore, in the embodiments of the present disclosure, after calculating the external parameter of a single camera, a verification link is added, that is, the coordinates of the 3D point corresponding to each verification point in the world coordinate system are calculated using the current external parameters of the cameras separately, and the loss function is calculated based on the coordinates of these 3D points. The loss function is used to measure the overlay error of calibration of the cameras under the current external parameters. That is, the smaller the loss function, the smaller the overlay error. For example, the loss function verifies whether the error between the 3D point of the verification point back to the world coordinate system and the true value of the verification point meets the requirement under the currently calculated external parameter. Furthermore, in the joint calibration of multi-camera external parameter, the 3D point corresponding to the verification point calculated for each camera may be obtained, and then the mean, variance or distance from the true value of these 3D points may be calculated, etc. to determine the loss function, so as to measure the overlay error in the multi-camera external parameter joint calibration process, and then determine whether the current external parameters of the cameras meet the requirement, or find a global optimal solution of joint calibration of the multi-camera external parameter through multiple iterations, so as to greatly reduce the overlay error of the external parameters.

As an embodiment of calculating the loss function, calculating the loss function based on the coordinates of the 3D point includes: using any verification point as a current verification point, and calculating a variance based on coordinates of a 3D point of the current verification point obtained by calculation corresponding to each camera; summing variances obtained by calculation corresponding to verification points, and using a sum value as the loss function.

If only one verification point is included in the verification point set, the coordinates of the 3D points of the verification point in the world coordinate system are calculated directly based on the external parameter of each camera, and the variance is calculated based on the coordinates of the 3D points to obtain the loss function.

If more than two verification points are included in the verification point set, each verification point needs to be calculated separately. Specifically, any verification point may be used as the current verification point, and then the coordinates of the 3D points of the current verification point in the world coordinate system are calculated based on the external parameter of each camera, and the variance is calculated based on the coordinates of the respective 3D points. According to this method, after calculating each verification point separately, the calculated variances corresponding to the verification points are determined, and these variances are summed to obtain the loss function.

Here, it should be noted that by calculating the variance, it is possible to measure the degree of convergence of the 3D points mapped by the cameras for the same verification point in the world coordinate system. It may be seen from (c) in FIG. 2 that the better the degree of convergence, the reprojection errors of the cameras are more tend to be in the same direction, and the smaller the overlay error (as shown by the dotted line in the figure). Thereby, it plays a measuring and verifying function to the overlay error of calibration of the cameras under the current external parameters through the loss function, that is, the smaller the loss function, the smaller the overlay error, and the corresponding external parameter is optimal.

In addition, regarding the calculation of the variance, two cases may be included. For the case where the true value of the verification point in the world coordinate system can be obtained, the true value may be used as an expected value of the 3D points corresponding to the verification point, and then the variance is calculated based on the distance between the 3D points and the true value. For the case where the true value of the verification point cannot be obtained, the mean of the 3D points in the three directions of x, y, and z may be calculated first to obtain an optimal estimate of the true value, and then the variance is calculated based on the distance between the 3D points and the optimal estimate.

As another embodiment of calculating the loss function, calculating the loss function based on the coordinate of the 3D point includes: using any verification point as a current verification point, determining a distance between a 3D point of the current verification point obtained by calculation corresponding to each camera and the true value based on a truth value of the current verification point in the world coordinate system, and calculating a mean of the distance; calculating a variance based on coordinates of the 3D point of the current verification point obtained by calculation corresponding to each camera combining the truth value; weighting and summing the variance and the mean obtained by calculation corresponding to the current verification point; and summing results of the weighting and summing obtained by calculation corresponding to verification points, and using a sum value as the loss function.

In this embodiment, the truth value of the current verification point in the world coordinate system can be obtained. In this regard, the distance between the 3D points and the truth value may be calculated first, and the mean of the distance may be calculated. Then, similarly, the true value is used as the expected value of the 3D points corresponding to the current verification point, and the variance is calculated based on the distance between the 3D points and the true value. The variance obtained by calculation and the mean corresponding to the current verification point are weighted and summed, and finally, the results of the weighting and summing obtained by calculation corresponding to the verification points are summed, and the sum value is used as the loss function.

It should be noted that, in the case that the true value of the verification point in the world coordinate system can be obtained, the mean and the variance are used as part of the loss function. The variance may measure the degree of convergence of the 3D points, and the mean may measure the distance between the 3D points and the true value. The weight may be used to set the importance of both the variance and the mean to the overlay error, so as to further measure the overlay error of calibration of the cameras from the two aspects of convergence and distance from the true value, in order to improve the accuracy of finding the optimal solution of the external parameter.

In addition, in another embodiment, calculating the loss function based on the coordinate of the 3D point, further includes: determining a minimum distance value between any two 3D points in 3D points of the current verification point obtained by calculation corresponding to each camera; and adding the loss function to the distance value corresponding to each verification point obtained by calculation, on the basis of the loss function obtained by calculation.

Specifically, in this embodiment, on the basis of the loss function that has been calculated, another dimension is superimposed, that is, the minimum distance value between any two 3D points. Because the distance between two points may also measure the size of the overlay error, if the loss function includes this dimension, then the overlay error may be further measured from the perspective of the size of the overlay error, and similarly, the smaller the loss function, the smaller the overlay error, the better the corresponding camera external parameter. In addition, respective weights may alternatively be set for the three dimensions of variance, mean and distance value, and the final sum value is obtained as the loss function by weighted summation.

The technical solution of the embodiments of the present disclosure, by adding a verification link on the basis of the existing technology, the loss function is calculated based on the 3D point of a verification point mapped back to the world coordinate system, and the loss function is used to measure an overlay error of calibration of the cameras under the current external parameters. When the loss function is the smallest, the difference of error direction of the external parameters of the current cameras may be calibrated as the smallest, which greatly reduces the overlay of errors and reduces the overlay error, so as to perform joint calibration of multi-camera based on the loss function to determine the final target external parameter and provide a good basis for subsequent multi-camera fusion.

Figure 3:
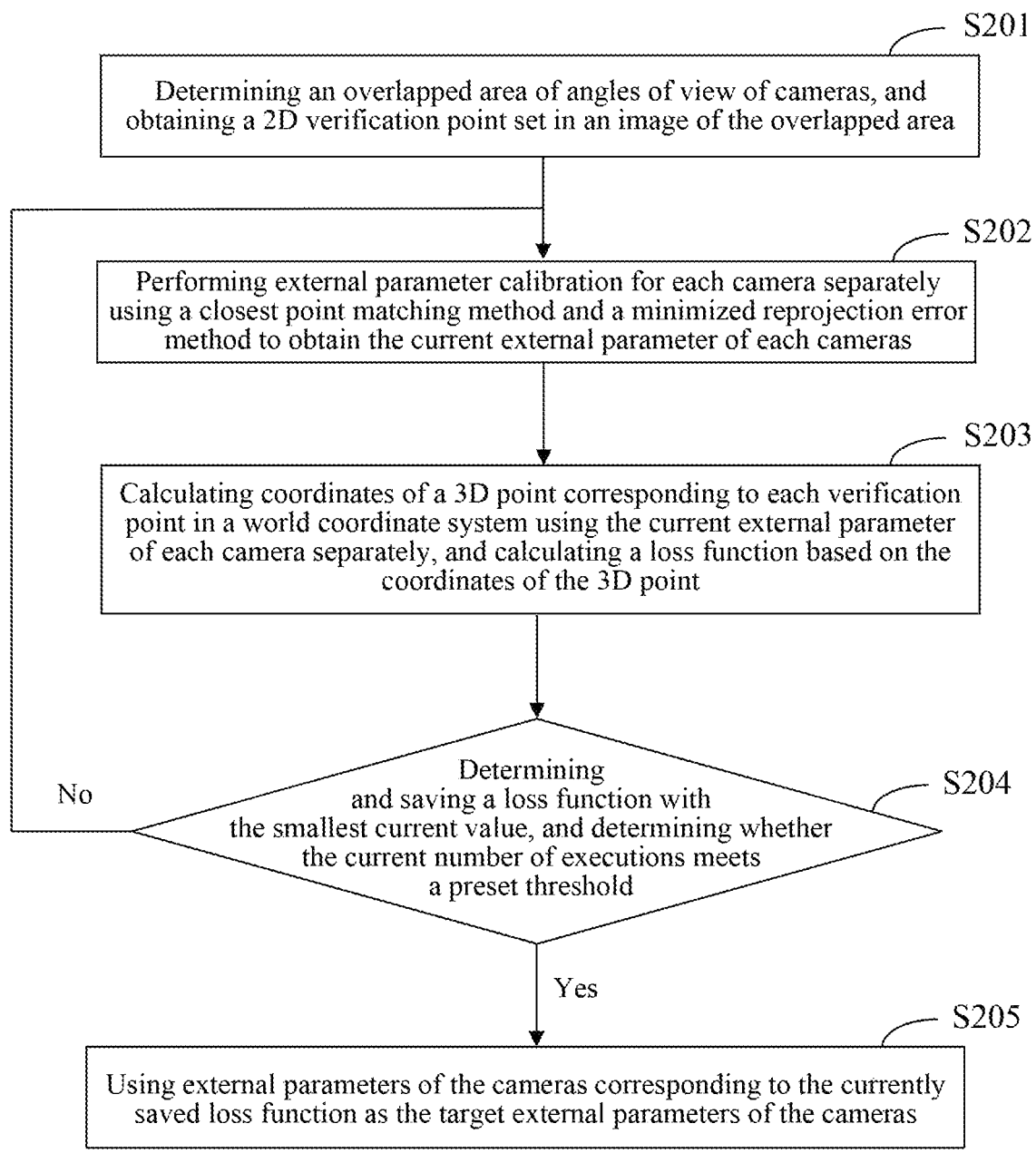
FIG. 3 is a schematic flowchart of the method for jointly calibrating external parameters of multiple cameras according to a second embodiment of the present disclosure.

FIG. 3 is a schematic flowchart of the method for jointly calibrating external parameters of multiple cameras according to the second embodiment of the present disclosure. The present embodiment is further optimized on the basis of the above embodiment. As shown in FIG. 3, the method specifically includes the following steps.

S201, determining an overlapped area of angles of view of cameras, and obtaining a 2D verification point set in an image of the overlapped area, the 2D verification point set including at least one verification point.

S202, performing external parameter calibration for each camera separately using a closest point matching method and a minimized reprojection error method to obtain a current external parameter of each camera.

S203, calculating coordinates of a 3D point corresponding to each verification point in a world coordinate system using the current external parameters of the cameras separately, and calculating a loss function based on the coordinates of the 3D point.

S204, determining and saving a loss function with the smallest current value, and determining whether the current number of executions meets a preset threshold, if not, return to execute step S202, and if yes, execute step S205.

S205, using external parameters of the cameras corresponding to the currently saved loss function as the target external parameters of the cameras.

In the present embodiment, through multiple iterations of the camera external parameter, the loss function with the smallest value is selected in the loss functions obtained by multiple time of calculation, and the camera external parameter corresponding to the loss function with the smallest value is selected as the optimal solution, that is, the target external parameter.

Specifically, the number of iterations may be set in advance. For example, the first iteration calibrates the external parameters of the cameras, the loss function of this iteration is calculated based on the external parameters, and the second iteration calibrates the external parameters of the cameras, the loss function of this iteration is calculated based on the external parameters, then the two loss functions of the first iteration and the second iteration are compared to determine which value is the smaller, and the loss function with the smaller value is saved. Then, the third iteration is performed, and then the loss function corresponding to the third iteration is compared with the loss function saved last time, and the loss function with the smaller current value is saved. The above operation is repeated until the number of iterations meets the threshold, and the external parameters corresponding to the loss function saved at this time is used as the optimal solution.

The technical solution of the embodiments of the present disclosure, by adding a verification to obtain the optimal solution link on the basis of the existing technology, the loss function is calculated based on the 3D point of a verification point mapped back to the world coordinate system, and the loss function is used to measure an overlay error of calibration of the cameras under the current external parameters. The optimal solution is compared and selected based on the loss function obtained through multiple iterations, to find the global optimal solution of joint calibration of the multi-camera external parameter, and constrain the direction of multi-camera reprojection error in the same direction, thereby greatly reducing the overlay error of the external parameters to obtain the optimal target external parameters, which provides a good basis for subsequent multi-camera fusion.

Figure 4:
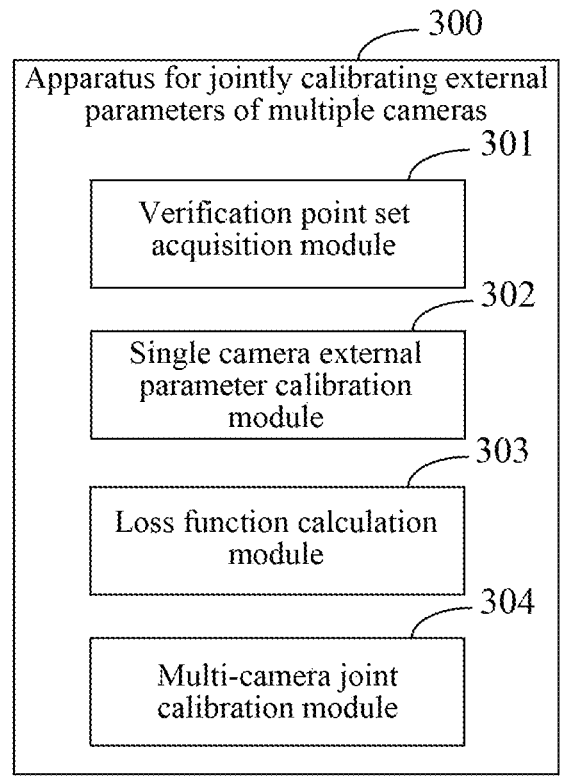
FIG. 4 is a schematic structural diagram of an apparatus for jointly calibrating external parameters of multiple cameras according to a third embodiment of the present disclosure.

FIG. 4 is a schematic structural diagram of an apparatus for jointly calibrating external parameters of multiple cameras according to the third embodiment of the present disclosure. The present embodiment is applicable to the case of joint calibration of multi-camera external parameter, for example, a plurality of cameras arranged in a distributed mode in a drive test perception application scenario. The apparatus may implement the method for jointly calibrating external parameters of multiple cameras described in any embodiment of the present disclosure. As shown in FIG. 4, the apparatus 300 specifically includes: a verification point set acquisition module 301, configured to determine an overlapped area of angles of view of cameras, and obtain a 2D verification point set in an image of the overlapped area, the 2D verification point set including at least one verification point; a single camera external parameter calibration module 302, configured to perform external parameter calibration for each camera separately to obtain a current external parameter of each camera; a loss function calculation module 303, configured to calculate coordinates of a 3D point corresponding to each verification point in a world coordinate system using the current external parameter of each camera separately, and calculate a loss function based on the coordinates of the 3D point, the loss function being used to measure an overlay error of calibration of the cameras under the current external parameter; and a multi-camera joint calibration module 304, configured to perform joint calibration based on the loss function to obtain a target external parameter of each camera.

Alternatively, the multi-camera joint calibration module 304 is specifically configured to: execute repeatedly following operations until a number of executions meets a preset threshold, and using an external parameter of a camera corresponding to a loss function whose value satisfies a preset condition in loss functions obtained by calculation as the target external parameter of the camera: performing external parameter calibration for each camera separately to obtain the current external parameter of each cameras; and calculating the coordinates of the 3D point corresponding to each verification point in the world coordinate system using the current external parameter of each camera separately, and calculating the loss function based on the coordinate of the 3D point.

Alternatively, the loss function calculation module 303 includes: a 3D point coordinate calculation unit, configured to calculate the coordinates of the 3D point corresponding to each verification point in the world coordinate system using the current external parameter of each camera separately; and a first loss function calculation unit, specifically configured to: use any verification point as a current verification point, and calculate a variance based on coordinates of a 3D point of the current verification point obtained by calculation corresponding to each camera; and sum variances obtained by calculation corresponding to verification points, and use a sum value as the loss function.

Alternatively, the loss function calculation module 303 includes: a 3D point coordinate calculation unit, configured to calculate the coordinates of the 3D point corresponding to each verification point in the world coordinate system using the current external parameter of each camera separately; and a second loss function calculation unit, configured to: use any verification point as a current verification point, determine a distance between a 3D point of the current verification point obtained by calculation corresponding to each camera and the true value based on a truth value of the current verification point in the world coordinate system, and calculate a mean of the distance; calculate a variance based on coordinates of the 3D point of the current verification point obtained by calculation corresponding to each camera combining the truth value; weight and sum the variance and the mean obtained by calculation corresponding to the current verification point; and sum results of the weighting and summing obtained by calculation corresponding to verification points, and use a sum value as the loss function.

Alternatively, the loss function calculation module further includes a third loss function calculation unit, configured to: determine a minimum distance value between any two 3D points in 3D points of the current verification point obtained by calculation corresponding to each camera; and add the loss function to the distance value corresponding to each verification point obtained by calculation, on the basis of the loss function obtained by calculation by the first loss function calculation unit or the second loss function calculation unit.

Alternatively, the single camera external parameter calibration module 302 is specifically configured to: perform external parameter calibration for each camera separately using a closest point matching method and a minimized reprojection error method to obtain the current external parameter of each camera.

The apparatus 300 for jointly calibrating external parameters of multiple cameras provided by an embodiment of the present disclosure may execute the method for jointly calibrating external parameters of multiple cameras provided by any embodiment of the present disclosure, and has the corresponding function modules and beneficial effects to execute the method. For content that is not described in detail in the present embodiment, reference may be made to the description in any method embodiment of the present disclosure.

According to the embodiments of the present disclosure, embodiments of the present disclosure also provide an electronic device and a readable storage medium.

Figure 5:
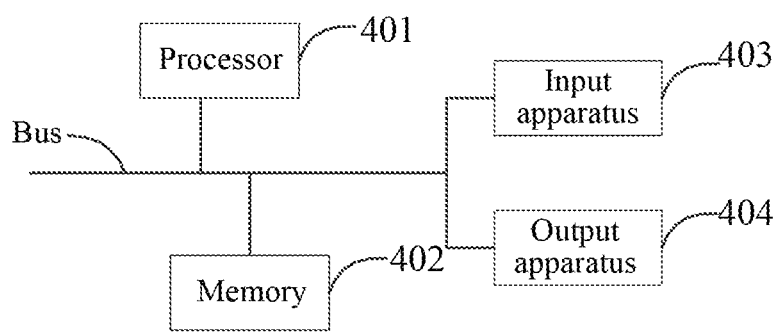
FIG. 5 is a block diagram of an electronic device for implementing the method for jointly calibrating a external parameters of multiple cameras according to an embodiment of the present disclosure.

As shown in FIG. 5, is a block diagram of an electronic device for implementing the method for jointly calibrating external parameters of multiple cameras according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the electronic device includes: one or more processors 401, a memory 402, and interfaces for connecting various components, including a high-speed interface and a low-speed interface. The various components are connected to each other using different buses and may be installed on a common motherboard or in other methods as needed. The processor may process instructions executed within the electronic device, including instructions stored in or on the memory to display GUI graphical information on an external input/output apparatus such as a display device coupled to the interface. In other embodiments, a plurality of processors and/or a plurality of buses may be used with a plurality of memories if needed. Similarly, a plurality of electronic devices may be connected, and each device provides some necessary operations (for example, as a server array, a set of blade servers, or a multi-processor system). One processor 401 is used as an example in FIG. 5.

The memory 402 is a non-transitory computer readable storage medium provided by an embodiment of the present disclosure. Here, the memory stores instructions executable by at least one processor, so that the at least one processor performs the method for jointly calibrating external parameters of multiple cameras provided by the embodiments of the present disclosure. The non-transitory computer readable storage medium of the embodiment of the present disclosure stores computer instructions, to cause the computer to perform the method for jointly calibrating external parameters of multiple cameras provided by the present disclosure.

The memory 402 as a non-transitory computer readable storage medium may be used to store non-transitory software programs, non-transitory computer executable programs and modules, such as program instructions/modules (for example, the verification point set acquisition module 301, the single camera external parameter calibration module 302, the loss function calculation module 303 and the multi-camera joint calibration module 304 shown in FIG. 4) corresponding to the method for jointly calibrating external parameters of multiple cameras in the embodiments of the present disclosure. The processor 401 executes non-transitory software programs, instructions, and modules stored in the memory 402 to execute various functional applications and data processing of the server, that is, to implement the method for jointly calibrating external parameters of multiple cameras in the foregoing method embodiments.

The memory 402 may include a program storage area and a data storage area. The program storage area may store an operating system and an application required for at least one function. The data storage area may store data and the like created according to the usage of a terminal device. In addition, the memory 402 may include a high-speed random access memory, and may also include a non-transitory memory, e.g., at least one disk storage device, a flash memory device or other non-volatile solid-state storage devices. In some embodiments, the memory 402 may further include memories remotely arranged relative to the processor 401, where the remote memories may be connected to the terminal device by a network. An example of the above network includes but not limited to, the Internet, an enterprise intranet, a local area network, a mobile communications network, and a combination thereof.

The electronic device of the method for jointly calibrating external parameters of multiple cameras of the embodiments of the present disclosure may further include: an input apparatus 403 and an output apparatus 404. The processor 401, the memory 402, the input apparatus 403, and the output apparatus 404 may be connected via the bus or in other methods. In FIG. 4, connection via the bus is used as an example.

The input apparatus 403 may receive input digital or character information, and generate key signal input related to implementing user settings and function control of the electronic device of the method for jointly calibrating external parameters of multiple cameras of the embodiments of the present disclosure, for example, an input apparatuses such as a touch screen, keypad, mouse, trackpad, touchpad, pointing stick, one or more mouse buttons, trackball, or joystick. The output apparatus 404 may include a display device, an auxiliary lighting apparatus (for example, LED), a tactile feedback apparatus (for example, a vibration motor), or the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, a dedicated ASIC (application specific integrated circuit), computer hardware, firmware, software, and/or combinations thereof. These various embodiments may include: being implemented in one or more computer programs, which may be executed and/or interpreted on a programmable system including at least one programmable processor. The programmable processor may be a dedicated or general-purpose programmable processor, which may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor, and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic device (PLD)) used to provide machine instructions and/or data to the programmable processor, including machine readable medium that receives machine instructions as machine readable signals. The term "machine readable signal" refers to any signal used to provide the machine instructions and/or data to the programmable processor.

In order to provide interaction with a user, the systems and technologies described herein may be implemented on a computer, and the computer has: a display apparatus (e.g., CRT (cathode ray tube) or LCD (liquid crystal display) monitor) for displaying information to the user; and a keyboard and a pointing apparatus (for example, a mouse or trackball), and the user may use the keyboard and the pointing apparatus to provide input to the computer. Other kinds of apparatuses may also be used to provide interaction with the user; for example, the feedback provided to the user may be any form of sensory feedback (for example, visual feedback, auditory feedback, or tactile feedback); and may use any form (including acoustic input, voice input, or tactile input) to receive input from the user.

The systems and technologies described herein may be implemented in a computing system (e.g., as a data server) that includes back-end components, or a computing system (e.g., an application server) that includes middleware components, or a computing system (for example, a user computer with a graphical user interface or a web browser, through which the user may interact with the embodiments of the systems and technologies described herein) that includes front-end components, or a computing system that includes any combination of such back-end components, middleware components, or front-end components. The components of the system may be interconnected by any form or medium of digital data communication (e.g., a communication network). Examples of the communication network include: local area network (LAN), wide area network (WAN), and Internet.

The computer system may include a client and a server. The client and the server are generally far from each other and usually interact through a communication network. The client and server relationship is generated by computer programs operating on the corresponding computer and having client-server relationship with each other.

The technical solution according to the embodiments of the present disclosure, by adding a verification link on the basis of the existing technology, a loss function is calculated based on the 3D point of a verification point mapped back to the world coordinate system, and the loss function is used to measure an overlay error of calibration of the cameras under the current external parameters, thus playing certain verification function, and multi-camera joint calibration is performed based on the loss function to determine a final target external parameter, which largely eliminates the overlay of multi-camera errors and provides a good basis for subsequent multi-camera fusion.

It should be understood that various forms of processes shown above may be used to reorder, add, or delete steps. For example, the steps described in the present disclosure may be performed in parallel, sequentially, or in different orders, as long as the desired results of the technical solution disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for jointly calibrating external parameters of multiple cameras, the method comprising:
    determining an overlapped area of angles of view of cameras, and obtaining a two-dimensional (2D) verification point set in an image of the overlapped area, the 2D verification point set comprising at least one verification point;
    performing external parameter calibration for each camera separately to obtain a current external parameter of each camera;
    calculating coordinates of a three-dimensional (3D) point corresponding to each verification point in a world coordinate system using the current external parameter of each camera separately, and calculating a loss function based on the coordinates of the 3D point, the loss function being used to measure an overlay error of calibration of the cameras under the current external parameter; and
    performing joint calibration based on the loss function to obtain a target external parameter of each camera.

2. The method according to claim 1, wherein the performing joint calibration based on the loss function to obtain a target external parameter of each cameras, comprises:
    executing repeatedly following operations until a number of executions meets a preset threshold, and using an external parameter of an cameras corresponding to a loss function whose value satisfies a preset condition in loss functions obtained by calculation as the target external parameter of the camera:
    performing external parameter calibration for each camera separately to obtain the current external parameter of each camera; and
    calculating the coordinates of the 3D point corresponding to each verification point in the world coordinate system using the current external parameter of each camera separately, and calculating the loss function based on the coordinates of the 3D point.

3. The method according to claim 1, wherein calculating the loss function based on the coordinates of the 3D point, comprises:
    using any verification point as a current verification point, and calculating a variance based on coordinates of a 3D point of the current verification point obtained by calculation corresponding to each camera; and
    summing variances obtained by calculation corresponding to verification points, and using a sum value as the loss function.

4. The method according to claim 3, wherein calculating the loss function based on the coordinates of the 3D point, further comprises:
    determining a minimum distance value between any two 3D points in 3D points of the current verification point obtained by calculation corresponding to each camera; and
    adding the loss function to the distance value corresponding to each verification point obtained by calculation, on the basis of the loss function obtained by calculation.

5. The method according to claim 1, wherein calculating the loss function based on the coordinates of the 3D point, comprises:
    using any verification point as a current verification point, determining a distance between a 3D point of the current verification point obtained by calculation corresponding to each camera and the true value based on a truth value of the current verification point in the world coordinate system, and calculating a mean of the distance;

calculating a variance based on coordinates of the 3D point of the current verification point obtained by calculation corresponding to each camera combining the truth value;

weighting and summing the variance and the mean obtained by calculation corresponding to the current verification point; and summing results of the weighting and summing obtained by calculation corresponding to verification points, and using a sum value as the loss function.

6. The method according to claim 1, wherein the performing external parameter calibration for each camera separately to obtain the current external parameter of each camera, comprises:

performing external parameter calibration for each camera separately using a closest point matching method and a minimized reprojection error method to obtain the current external parameter of each camera.

7. An apparatus for jointly calibrating external parameters of multiple cameras, the apparatus comprising:

at least one processor; and a memory storing instructions, wherein the instructions when executed by the at least one processor, cause the at least one processor to perform operations, the operations comprising:

determining an overlapped area of angles of view of cameras, and obtaining a two-dimensional (2D) verification point set in an image of the overlapped area, the 2D verification point set comprising at least one verification point;

performing external parameter calibration for each camera separately to obtain a current external parameter of each cameras;

calculating a coordinate of a three-dimensional (3D) point corresponding to each verification point in a world coordinate system using the current external parameter of each cameras separately, and calculating a loss function based on the coordinates of the 3D point, the loss function being used to measure an overlay error of calibration of the cameras under the current external parameter; and performing joint calibration based on the loss function to obtain a target external parameter of each camera.

8. The apparatus according to claim 7, wherein the performing joint calibration based on the loss function to obtain a target external parameter of each cameras, comprises:

executing repeatedly following operations until a number of executions meets a preset threshold, and using an external parameter of an cameras corresponding to a loss function whose value satisfies a preset condition in loss functions obtained by calculation as the target external parameter of the camera:

performing external parameter calibration for each camera separately to obtain the current external parameters of each camera; and calculating the coordinates of the 3D point corresponding to each verification point in the world coordinate system using the current external parameter of each camera separately, and calculating the loss function based on the coordinates of the 3D point.

9. The apparatus according to claim 7, wherein calculating the loss function based on the coordinates of the 3D point, comprises:

using any verification point as a current verification point, and calculating a variance based on coordinates of a 3D point of the current verification point obtained by calculation corresponding to each camera; and summing variances obtained by calculation corresponding to verification points, and using a sum value as the loss function.

10. The apparatus according to claim 9, wherein calculating the loss function based on the coordinates of the 3D point, further comprises:

determining a minimum distance value between any two 3D points in 3D points of the current verification point obtained by calculation corresponding to each camera; and adding the loss function to the distance value corresponding to each verification point obtained by calculation, on the basis of the loss function obtained by calculation.

11. The apparatus according to claim 7, wherein calculating the loss function based on the coordinates of the 3D point, comprises:

using any verification point as a current verification point, determining a distance between a 3D point of the current verification point obtained by calculation corresponding to each camera and the true value based on a truth value of the current verification point in the world coordinate system, and calculate a mean of the distance;

calculating a variance based on coordinates of the 3D point of the current verification point obtained by calculation corresponding to each camera combining the truth value;

weighting and summing the variance and the mean obtained by calculation corresponding to the current verification point; and summing results of the weighting and summing obtained by calculation corresponding to verification points, and using a sum value as the loss function.

12. The apparatus according to claim 7, wherein the performing external parameter calibration for each camera separately to obtain the current external parameter of each camera, comprises:

performing external parameter calibration for each camera separately using a closest point matching method and a minimized reprojection error method to obtain the current external parameter of each camera.

13. A non-transitory computer-readable storage medium, storing computer instructions, the computer instructions, when executed by the at least one processor, cause the at least one processor to perform operations, the operations comprising:

determining an overlapped area of angles of view of cameras, and obtaining a two-dimensional (2D) verification point set in an image of the overlapped area, the 2D verification point set comprising at least one verification point;

performing external parameter calibration for each camera separately to obtain a current external parameter of each cameras;

calculating a coordinate of a three-dimensional (3D) point corresponding to each verification point in a world coordinate system using the current external parameter of each cameras separately, and calculating a loss function based on the coordinates of the 3D point, the loss function being used to measure an overlay error of calibration of the cameras under the current external parameter; and performing joint calibration based on the loss function to obtain a target external parameter of each camera.

14. The non-transitory computer-readable storage medium according to claim 13, wherein the performing joint calibration based on the loss function to obtain a target external parameter of each cameras, comprises:

executing repeatedly following operations until a number of executions meets a preset threshold, and using an external parameter of an cameras corresponding to a loss function whose value satisfies a preset condition in loss functions obtained by calculation as the target external parameter of the camera:

performing external parameter calibration for each camera separately to obtain the current external parameters of each camera; and calculating the coordinates of the 3D point corresponding to each verification point in the world coordinate system using the current external parameter of each camera separately, and calculating the loss function based on the coordinates of the 3D point.

15. The non-transitory computer-readable storage medium according to claim 13, wherein calculating the loss function based on the coordinates of the 3D point, comprises:

using any verification point as a current verification point, and calculating a variance based on coordinates of a 3D point of the current verification point obtained by calculation corresponding to each camera; and summing variances obtained by calculation corresponding to verification points, and using a sum value as the loss function.

16. The non-transitory computer-readable storage medium according to claim 15, wherein calculating the loss function based on the coordinates of the 3D point, further comprises:

determining a minimum distance value between any two 3D points in 3D points of the current verification point obtained by calculation corresponding to each camera; and adding the loss function to the distance value corresponding to each verification point obtained by calculation, on the basis of the loss function obtained by calculation.

17. The non-transitory computer-readable storage medium according to claim 13, wherein calculating the loss function based on the coordinates of the 3D point, comprises:

using any verification point as a current verification point, determining a distance between a 3D point of the current verification point obtained by calculation corresponding to each camera and the true value based on a truth value of the current verification point in the world coordinate system, and calculate a mean of the distance;

calculating a variance based on coordinates of the 3D point of the current verification point obtained by calculation corresponding to each camera combining the truth value;

weighting and summing the variance and the mean obtained by calculation corresponding to the current verification point; and summing results of the weighting and summing obtained by calculation corresponding to verification points, and using a sum value as the loss function.

18. The non-transitory computer-readable storage medium according to claim 13, wherein the performing external parameter calibration for each camera separately to obtain the current external parameter of each camera, comprises:

performing external parameter calibration for each camera separately using a closest point matching method and a minimized reprojection error method to obtain the current external parameter of each camera.

* * * * *